US012581557B2

(12) United States Patent
Sun et al.

(10) Patent No.: US 12,581,557 B2
(45) Date of Patent: Mar. 17, 2026

(54) METHOD AND APPARATUS FOR IMPROVING RELIABILITY AND REDUCING POWER CONSUMPTION FOR FR2 RRM

(71) Applicant: APPLE INC., Cupertino, CA (US)

(72) Inventors: Haitong Sun, Cupertino, CA (US); Dawei Zhang, Saratoga, CA (US); Pengkai Zhao, Cupertino, CA (US); Wei Zeng, Saratoga, CA (US); Wen Zhao, San Jose, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 552 days.

(21) Appl. No.: 17/905,771

(22) PCT Filed: Sep. 24, 2021

(86) PCT No.: PCT/CN2021/120131
§ 371 (c)(1),
(2) Date: Sep. 7, 2022

(87) PCT Pub. No.: WO2023/044705
PCT Pub. Date: Mar. 30, 2023

(65) Prior Publication Data
US 2024/0215090 A1 Jun. 27, 2024

(51) Int. Cl.
*H04W 76/15* (2018.01)
*H04L 5/00* (2006.01)
(Continued)

(52) U.S. Cl.
CPC ............. *H04W 76/15* (2018.02); *H04L 5/001* (2013.01); *H04W 24/08* (2013.01); *H04W 72/21* (2023.01); *H04W 76/30* (2018.02)

(58) Field of Classification Search
CPC ..... H04W 76/15; H04W 24/08; H04W 72/21; H04W 76/30; H04W 88/02;
(Continued)

(56) References Cited

U.S. PATENT DOCUMENTS 10,485,048 B2    11/2019 Zeng et al.
10,993,104 B2*    4/2021 Kim ...................... H04L 5/0035
(Continued)

FOREIGN PATENT DOCUMENTS

CN      107211330 A      9/2017
WO      2019055165 A1    3/2019
(Continued)

OTHER PUBLICATIONS

Nokia, Alcatel-Lucent Shanghai Bell , "Dual connectivity between LTE and the New Rat", R2-162365, 3GPP TSG-RAN WG2 Meeting #93bis, Dubrovnik, Croatia, Agenda Item 9.3.1, Apr. 11-15, 2016, 4 pages.
(Continued)

*Primary Examiner* — Wutchung Chu
(74) *Attorney, Agent, or Firm* — Dorsey & Whitney LLP

(57) ABSTRACT

Disclosed are methods and apparatuses for improving reliability and reducing power consumption for FR2 RRM. In one aspect, a UE is capable of maintaining connectivity of a first RAT and connectivity of a second RAT. The UE is configured to send a RAT request to the cellular network, the RAT request indicating at least one preferred RAT that is selected from the first RAT and the second RAT, and use the at least one preferred RAT to carry data transmission between the UE and the cellular network.

15 Claims, 8 Drawing Sheets

LTE-NR Dual Connectivity

400

(51) Int. Cl.
  *H04W 24/08* (2009.01)
  *H04W 72/21* (2023.01)
  *H04W 76/30* (2018.01)
(58) Field of Classification Search
  CPC ......... H04W 52/0216; H04W 52/0219; H04W
          48/18; H04W 76/16; H04L 5/001; H04B
                        7/06956; Y02D 30/70
  See application file for complete search history.

(56) References Cited

U.S. PATENT DOCUMENTS

| | | | | |
|---|---|---|---|---|
| 11,109,369 | B2 * | 8/2021 | Futaki ................... | H04L 5/0091 |
| 11,546,968 | B2 * | 1/2023 | Zhang ................... | H04W 72/27 |
| 11,558,795 | B2 * | 1/2023 | Kim ....................... | H04W 36/08 |
| 11,664,951 | B2 * | 5/2023 | Yiu ........................ | H04L 5/005 370/329 |
| 12,369,213 | B2 * | 7/2025 | Orsino ................. | H04W 76/14 |
| 2010/0279682 | A1 | 11/2010 | Rangaiah et al. | |
| 2016/0100351 | A1 | 4/2016 | Yang et al. | |
| 2017/0273095 | A1 * | 9/2017 | Heo ....................... | H04W 72/52 |
| 2018/0098258 | A1 | 4/2018 | Annam et al. | |
| 2018/0220470 | A1 | 8/2018 | Zacharias et al. | |
| 2019/0090181 | A1 * | 3/2019 | Iyer ....................... | H04W 24/08 |
| 2019/0109697 | A1 * | 4/2019 | Lee ....................... | H04L 5/1438 |
| 2019/0110236 | A1 * | 4/2019 | Huang ............. | H04W 36/0027 |
| 2019/0150042 | A1 * | 5/2019 | Srivastava ........... | H04W 48/16 455/436 |
| 2019/0349906 | A1 * | 11/2019 | Futaki .............. | H04W 36/0069 |
| 2020/0092737 | A1 * | 3/2020 | Siomina ............... | H04W 4/025 |
| 2020/0170063 | A1 * | 5/2020 | Hu ........................ | H04W 72/21 |
| 2020/0351638 | A1 * | 11/2020 | Kim ........................ | H04W 8/22 |
| 2021/0007025 | A1 * | 1/2021 | Kumar ................. | H04W 48/20 |
| 2021/0044993 | A1 * | 2/2021 | Jha ............... | H04W 36/008355 |
| 2021/0051767 | A1 * | 2/2021 | Zhang ................... | H04W 88/02 |
| 2021/0211972 | A1 * | 7/2021 | Zhang ................... | H04W 24/10 |
| 2021/0235368 | A1 * | 7/2021 | Jung ..................... | H04W 48/18 |
| 2021/0266801 | A1 * | 8/2021 | Shah ................... | H04B 17/336 |
| 2021/0289569 | A1 * | 9/2021 | Park ..................... | H04W 68/005 |
| 2022/0007443 | A1 * | 1/2022 | Xu ........................ | H04W 28/18 |
| 2022/0070953 | A1 * | 3/2022 | Gopal ................... | H04W 76/15 |
| 2022/0240145 | A1 * | 7/2022 | Kulkarni .............. | H04W 36/14 |
| 2022/0279617 | A1 * | 9/2022 | Orsino ................. | H04W 76/19 |
| 2022/0330358 | A1 * | 10/2022 | Orsino ................. | H04W 76/27 |
| 2022/0361141 | A1 * | 11/2022 | Kumar ................. | H04W 4/029 |
| 2022/0418035 | A1 * | 12/2022 | Vadapalli .......... | H04W 52/0216 |
| 2023/0032007 | A1 * | 2/2023 | Ali ...................... | H04B 7/0639 |
| 2023/0042702 | A1 * | 2/2023 | Kim ..................... | H04W 76/15 |
| 2023/0142993 | A1 * | 5/2023 | Wang ................... | H04W 40/22 370/315 |
| 2023/0164609 | A1 * | 5/2023 | Orsino ................. | H04W 76/30 709/224 |
| 2023/0328827 | A1 * | 10/2023 | Willars ............ | H04W 72/0453 370/329 |
| 2023/0379776 | A1 * | 11/2023 | Eklöf ............... | H04W 36/0005 |
| 2023/0412608 | A1 * | 12/2023 | Vaishnavi ............ | H04L 63/102 |
| 2024/0195594 | A1 * | 6/2024 | Araujo ................. | H04W 76/34 |
| 2024/0224187 | A1 * | 7/2024 | Venkata ............... | H04W 24/04 |

FOREIGN PATENT DOCUMENTS

| | | | | |
|---|---|---|---|---|
| WO | WO-2019095254 | A1 * | 5/2019 | ........ H04W 52/0216 |
| WO | 2021026890 | A1 | 2/2021 | |
| WO | 2021071253 | A1 | 4/2021 | |

OTHER PUBLICATIONS

PCT/CN2021/120131 , International Search Report and Written Opinion, Jun. 20, 2022, 9 pages.

* cited by examiner

600

Receive a RAT request from UE

610

Use the at least one preferred RAT to carry data transmission

Figure 7:
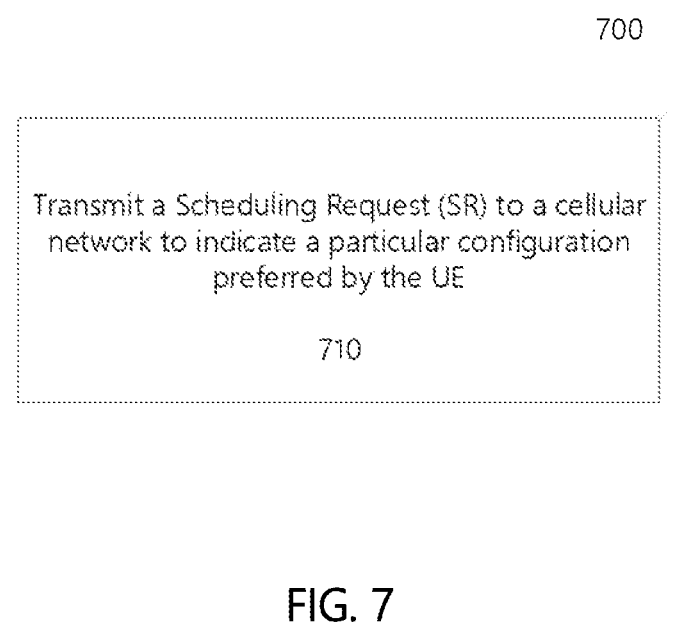

Transmit a Scheduling Request (SR) to a cellular network to indicate a particular configuration preferred by the UE

Conduct first beam measurement for a set of beams with a first set of activated antennal panels

810

Send a panel management indication to cellular network

820

METHOD AND APPARATUS FOR IMPROVING RELIABILITY AND REDUCING POWER CONSUMPTION FOR FR2 RRM

TECHNICAL FIELD

This application relates generally to wireless communication systems, including methods and apparatuses for improving reliability and reducing power consumption for FR2 Radio Resource Management (RRM).

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a network (NW), a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR), In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC). Frequency bands for 5G NR may be separated into two or more different frequency ranges. For example, Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially greater available bandwidth than bands in the FR1. Skilled persons will recognize these frequency ranges, which are provided by way of example, may change from time to time or from region to region.

SUMMARY

According to an aspect to the disclosure, a user equipment (UE) is disclosed. The UE comprises: at least one antenna; at least one radio coupled to the at least one antenna; and a processor coupled to the at least one radio; the UE is capable of maintaining a dual connectivity with a cellular network, the dual connectivity including connectivity of a first RAT and connectivity of a second RAT; wherein the UE is configured to: send a RAT request to the cellular network, the RAT request indicating at least one preferred RAT that is selected from the first RAT and the second RAT; and use the at least one preferred RAT to carry data transmission between the UE and the cellular network.

According to another aspect to the disclosure, a method is disclosed, comprising the operations performed by the above-described UE.

According to another aspect to the disclosure, a UE is disclosed. The UE comprises: at least one antenna; at least one radio coupled to the at least one antenna; and a processor coupled to the at least one radio; wherein the UE is capable of operating in NR. FR1 band and NR FR2 band, and wherein the UE is configured to: transmit a Scheduling Request (SR) to a cellular network to indicate a particular configuration preferred by the UE; wherein the particular configuration preferred by the UE comprises at least one of: whether the UE prefers to have grant in the NR FR1 band or the NR FR2 band; a number of Component Carriers (CCs) that the UE prefers to be scheduled; or one or more specific CCs of all available CCs that the UE prefers to be scheduled.

According to another aspect to the disclosure, a method is disclosed, comprising the operations performed by the above-described UE.

According to another aspect to the disclosure, a UE is disclosed. The UE comprises: at least one antenna; at least one radio coupled to the at least one antenna; and a processor coupled to the at least one radio; wherein the at least one antenna includes a plurality of antenna panels, and wherein the UE is configured to: conduct first beam measurement for a set of beams with a first set of activated antennal panels, and send a panel management indication to the cellular network.

According to another aspect to the disclosure, a method is disclosed, comprising the operations performed by the above-described UE.

According to another aspect to the disclosure, an apparatus is disclosed, comprising means for performing one or more elements of the method described herein.

According to another aspect to the disclosure, one or more computer-readable media are disclosed, storing instructions that, when executed by one or more processors, cause the one or more processors to perform one or more elements of the method described herein.

According to another aspect to the disclosure, a computer program product is disclosed, comprising instructions that, when executed by one or more processors, cause the one or more processors to perform one or more elements of the method described herein.

BRIEF DESCRIPTION OF THE DRAWINGS

To easily identify the discussion of any particular element or act, the most significant digit or digits in a reference number refer to the figure number in which that element is first introduced.

FIG. 6 illustrates a method for performing an optimized switch between different RATs for a UE, according to embodiments disclosed herein.

FIG. 7 illustrates a method for requesting a preferred configuration of the UE, according to embodiments disclosed herein.

DETAILED DESCRIPTION

Figure 1:
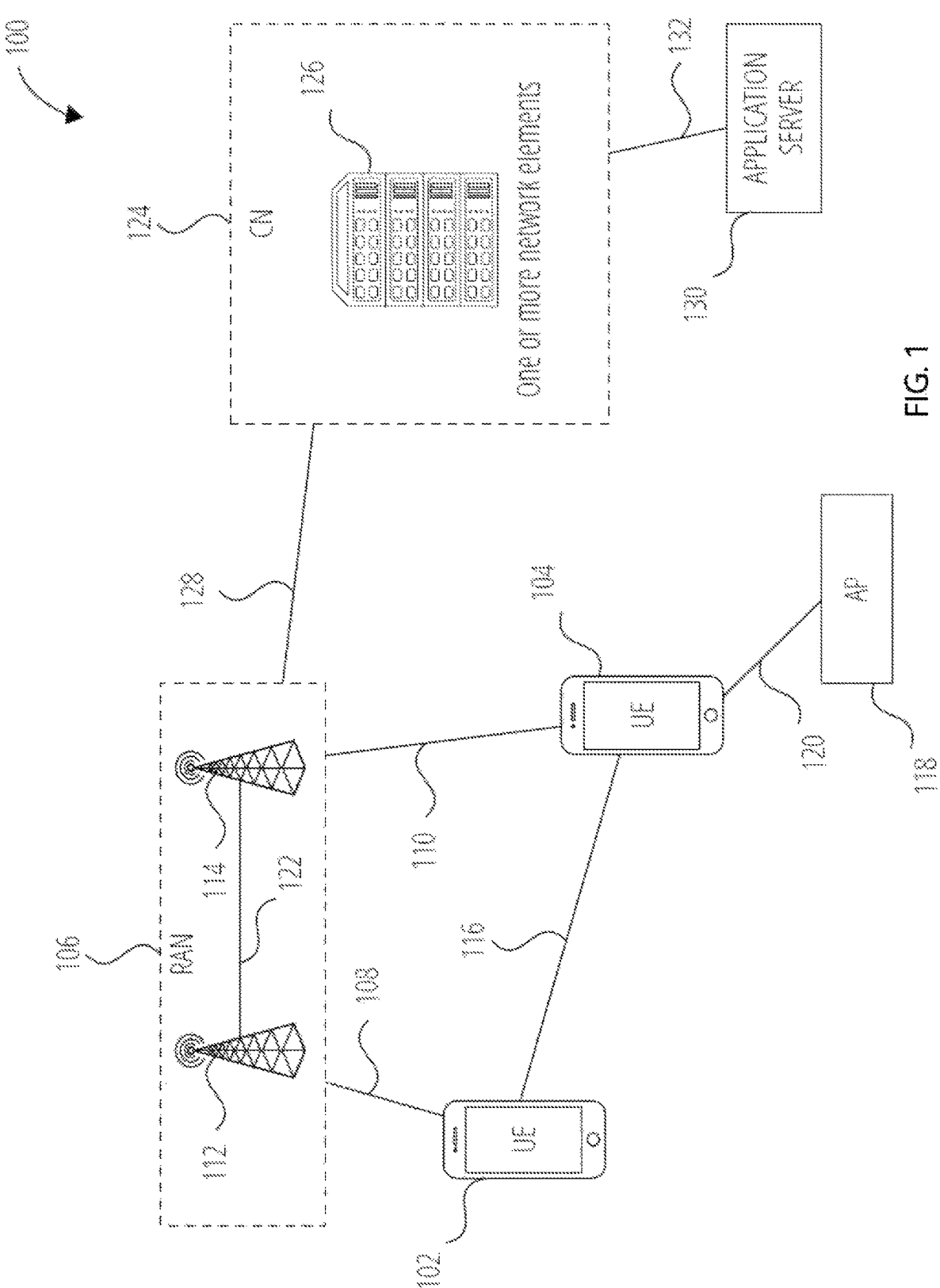
FIG. 1 illustrates an example architecture of a wireless communication system, according to embodiments disclosed herein.

An advanced UE may be able to maintain a dual connectivity with a cellular network (also referred to as "NW"). The dual connectivity may include connectivity of at least two different RATs. For example, a first RAT of the RATs may be 4G LTE and a second RAT of the RATs may be 5G NR. As a new generation of RAT, NR may be able to provide potentially greater available data bandwidth and higher peak data rate than LTE.

Frequency bands for NR may be further separated into two or more different frequency ranges, for example, the FR1 band and the FR2 band. NR operations in the FR2 band (also referred to as "FR2 operations") may provide potentially greater available data bandwidth and higher peak data rate than NR operations in the FR1 band (also referred to as "FR1 operations").

However, NR generally has smaller coverage and higher power consumption than LTE. Also, FR2 operations generally have smaller coverage, lower reliability, and higher power consumption than FR1 operations.

The UE with the dual connectivity is facing with many challenges. For example, FR2 mobility may be very challenging. For intra-RAT mobility, it may take very long time before UE can accurately measure a neighbor cell and finish all the Rx/Tx beam measurement. In addition. FR2 cell size is typically small and UE movement such as rotation can also change the beam quality dramatically. It is very challenging to ensure the FR2 mobility reliability. For inter-RAT mobility, the cellular network may not be able to timely and appropriately switch the UE between different RATs to adapt to a current state of the UE, because the cellular network does not have full and instant knowledge of the UE state, such as data condition, power consumption condition and/or thermal condition of the UE. The UE, on the other hand, may prefer to disable or minimize NR FR2 operations as much as possible.

Several issues have been observed in field test and measurement. For example, when operating in NR (more specifically, in the FR2 band), the UE may experience power consumption and thermal issues. These issues are severe when UE is experiencing a high peak data rate (e.g., above 1 Gbps). It is also observed that the current cellular network randomly switches the UE between the LTE RAT and the NR RAT, which may cause large overhead and additional UE power consumption but provide no performance benefit.

Enhancement is therefore needed to improve mobility procedure reliability and minimize power consumption and thermal issues for the UE. Aspects of RAT switch optimization, lean FR2 operation and improved management for UE are disclosed herein. It is apricated that one or more aspects may be used separately or be used jointly.

Exemplary Architecture

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

FIG. 1 illustrates an example architecture of a wireless communication system 100, according to embodiments disclosed herein. The following description is provided for an example wireless communication system 100 that operates in conjunction with the LTE system standards and/or 5G or NR system standards as provided by 3GPP technical specifications.

As shown by FIG. 1, the wireless communication system 100 includes UE 102 and UE 104 (although any number of UEs may be used). In this example, the UE 102 and the UE 104 are illustrated as smartphones (e.g., handheld touch-screen mobile computing devices connectable to one or more cellular networks), but may also comprise any mobile or non-mobile computing device configured for wireless communication.

The UE 102 and UE 104 may be configured to communicatively couple with a RAN 106. In embodiments, the RAN 106 may be NG-RAN, E-UTRAN, etc. The UE 102 and UE 104 utilize connections (or channels) (shown as connection 108 and connection 110, respectively) with the RAN 106, each of which comprises a physical communications interface. The RAN 106 can include one or more base stations, such as base station 112 and base station 114, that enable the connection 108 and connection 110.

In this example, the connection 108 and connection 110 are air interfaces to enable such communicative coupling, and may be consistent with RAT(s) used by the RAN 106, such as, for example, an LTE and/or NR.

In some embodiments, the UE 102 and UE 104 may also directly exchange communication data via a sidelink interface 116. The UE 104 is shown to be configured to access an access point (shown as AP 118) via connection 120. By way of example, the connection 120 can comprise a local wireless connection, such as a connection consistent with any IEEE 802.11 protocol, wherein the AP 118 may comprise a Wi-Fi® router. In this example, the AP 118 may be connected to another network (for example, the Internet) without going through a CN 124.

In embodiments, the UE 102 and UE 104 can be configured to communicate using orthogonal frequency division multiplexing (OFDM) communication signals with each other or with the base station 112 and/or the base station 114 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 112 or base station 114 may be implemented as one or more software entities running on server computers as part of a virtual network. In addition, or in other embodiments, the base station 112 or base station 114 may be configured to communicate with one another via interface 122. In embodiments where the wireless communication system 100 is an LTE system (e.g., when the CN 124 is an EPC), the interface 122 may be an X2 interface. The X2 interface may be defined between two or more base stations (e.g., two or more eNBs and the like) that connect to an EPC, and/or between two eNBs connecting to the EPC. In embodiments where the wireless communication system 100 is an NR system (e.g., when CN 124 is a 5GC), the interface 122 may be an Xn interface. The Xn interface is defined between two or more base stations (e.g., two or more gNBs and the like) that connect to 5GC, between a base station 112 (e.g., a gNB) connecting to 5GC and an eNB, and/or between two eNBs connecting to 5GC (e.g., CN 124).

The RAN 106 is shown to be communicatively coupled to the CN 124. The CN 124 may comprise one or more network elements 126, which are configured to offer various data and telecommunications services to customers/subscribers (e.g., users of UE 102 and UE 104) who are connected to the CN 124 via the RAN 106. The components of the CN 124 may be implemented in one physical device or separate physical devices including components to read and execute instructions from a machine-readable or computer-readable medium (e.g., a non-transitory machine-readable storage medium).

In embodiments, the CN 124 may be an EPC, and the RAN 106 may be connected with the CN 124 via an S1 interface 128. In embodiments, the S1 interface 128 may be split into two parts, an S1 user plane (S1-U) interface, which carries traffic data between the base station 112 or base station 114 and a serving gateway (S-GW), and the S1-MME interface, which is a signaling interface between the base station 112 or base station 114 and mobility management entities (MMEs).

In embodiments, the CN 124 may be a SOC, and the RAN 106 may be connected with the CN 124 via an NG interface 128. In embodiments, the NG interface 128 may be split into two parts, an NG user plane (NG-U) interface, which carries traffic data between the base station 112 or base station 114 and a user plane function (UPF), and the S1 control plane (NG-C) interface, which is a signaling interface between the base station 112 or base station 114 and access and mobility management functions (AMFs).

Generally, an application server 130 may be an element offering applications that use internet protocol (IP) bearer resources with the CN 124 (e.g., packet switched data services). The application server 130 can also be configured to support one or more communication services (e.g., VoIP sessions, group communication sessions, etc.) for the UE 102 and UE 104 via the CN 124. The application server 130 may communicate with the CN 124 through an IP communications interface 132.

Figure 2:
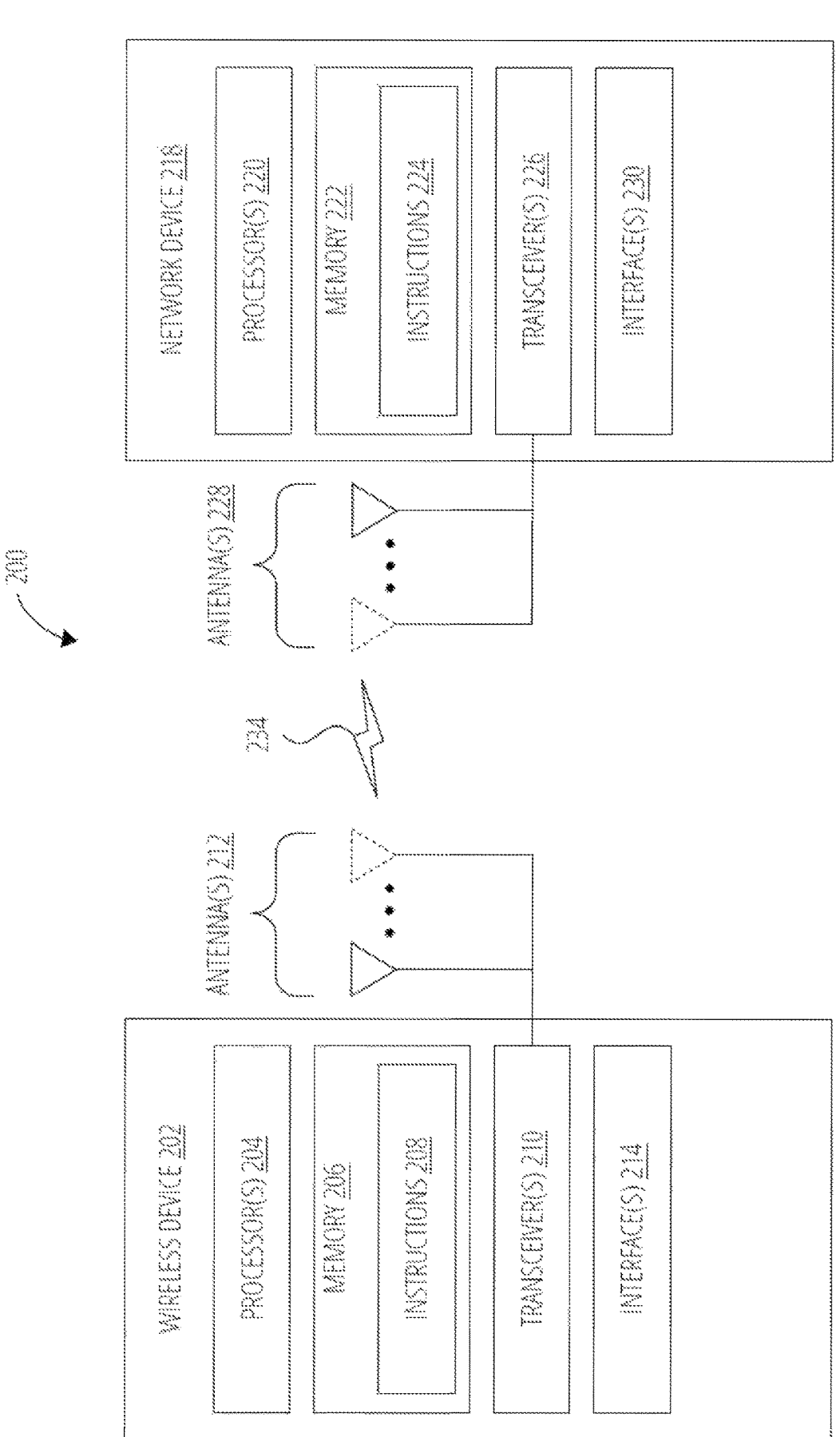
FIG. 2 illustrates a system for performing signaling between a wireless device and a network device, according to embodiments disclosed herein.

FIG. 2 illustrates a system 200 for performing signaling 234 between a wireless device 202 and a network device 218, according to embodiments disclosed herein. The system 200 may be a portion of a wireless communications system as herein described. The wireless device 202 may be, for example, a UE of a wireless communication system. The network device 218 may be, for example, a base station (e.g., an eNB or a gNB) of a wireless communication system.

The wireless device 202 may include one or more processor(s) 204. The processor(s) 204 may execute instructions such that various operations of the wireless device 202 are performed, as described herein. The processor(s) 204 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 202 may include a memory 206. The memory 206 may be a non-transitory computer-readable storage medium that stores instructions 208 (which may include, for example, the instructions being executed by the processor(s) 204). The instructions 208 may also be referred to as program code or a computer program. The memory 206 may also store data used by, and results computed by, the processor(s) 204.

The wireless device 202 may include one or more transceiver(s) 210 that may include radio frequency (RF) transmitter and/or receiver circuitry that use the antenna(s) 212 of the wireless device 202 to facilitate signaling (e.g., the signaling 234) to and/or from the wireless device 202 with other devices (e.g., the network device 218) according to corresponding RATs.

The wireless device 202 may include one or more antenna(s) 212 (e.g., one, two, four, or more). For embodiments with multiple antenna(s) 212, the wireless device 202 may leverage the spatial diversity of such multiple antenna(s) 212 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 202 may be accomplished according to precoding (or digital beamforming) that is applied at the wireless device 202 that multiplexes the data streams across the antenna(s) 212 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 202 may implement analog beamforming techniques, whereby phases of the signals sent by the antenna(s) 212 are relatively adjusted such that the (joint) transmission of the antenna(s) 212 can be directed (this is sometimes referred to as beam steering).

The wireless device 202 may include one or more interface(s) 214. The interface(s) 214 may be used to provide input to or output from the wireless device 202. For example, a wireless device 202 that is a UE may include interface(s) 214 such as microphones, speakers, a touch-screen, buttons, and the like in order to allow for input and/or output to the UE by a user of the UE. Other interfaces of such a UE may be made up of transmitters, receivers, and other circuitry (e.g., other than the transceiver(s) 210/antenna(s) 212 already described) that allow for communication between the UE and other devices and may operate according to known protocols (e.g., Wi-Fi®, Bluetooth®, and the like).

The network device 218 may include one or more processor(s) 220. The processor(s) 220 may execute instructions such that various operations of the network device 218 are performed, as described herein. The processor(s) 204 may include one or more baseband processors implemented using, for example, a CPU, a DSP, an ASIC, a controller, an FPGA device, another hardware device, a firmware device, or any combination thereof configured to perform the operations described herein.

The network device 218 may include a memory 222. The memory 222 may be a non-transitory computer-readable storage medium that stores instructions 224 (which may include, for example, the instructions being executed by the processor(s) 220). The instructions 224 may also be referred to as program code or a computer program. The memory 222 may also store data used by, and results computed by, the processor(s) 220.

The network device 218 may include one or more transceiver(s) 226 that may include RF transmitter and/or receiver circuitry that use the antenna(s) 228 of the network device 218 to facilitate signaling (e.g., the signaling 234) to and/or from the network device 218 with other devices (e.g., the wireless device 202) according to corresponding RATs.

The network device 218 may include one or more antenna(s) 228 (e.g., one, two, four, or more). In embodiments having multiple antenna(s) 228, the network device 218 may perform MIMO, digital beamforming, analog beamforming, beam steering, etc., as has been described.

The network device 218 may include one or more interface(s) 230. The interface(s) 230 may be used to provide input to or output from the network device 218. For example, a network device 218 that is a base station may include interface(s) 230 made up of transmitters, receivers, and other circuitry (e.g., other than the transceiver(s) 226/antenna(s) 228 already described) that enables the base station to communicate with other equipment in a core network, and/or that enables the base station to communicate with external networks, computers, databases, and the like for purposes of operations, administration, and maintenance of the base station or other equipment operably connected thereto.

Rat Switch Optimization

According to embodiments disclosed herein, a UE may be capable of maintaining a dual connectivity with a cellular network. The dual connectivity may include connectivity of a first RAT and connectivity of a second RAT. The UE may be able to maintain two connections with the cellular network, one for the first RAT and the other for the second RAT. The first RAT and the second RAT may provide different available data bandwidths and coverages for the UE. Also, the first RAT and the second RAT may have different levels of reliability. In addition, the first RAT and the second RAT may cause different level of power consumption of the UE.

According to an embodiment disclosed herein, the first RAT may be 4G LTE and the second RAT may be 5G NR. Although this disclosure mainly discusses LTE and NR, it is appreciated the dual connectivity of the UE is not limited thereto. In other embodiments, the dual connectivity of the UE may include any other appropriate RAT, such as any RAT for a future generation of 3GPP standards.

A switch between the first RAT and the second RAT may occur for the UE. In one implementation, the switch between the first RAT and the second RAT may be initiated by the cellular network. Specifically, the cellular network may configure the UE to switch from one of the first RAT and the second RAT to the other. However, the cellular network may not be able to timely and appropriately switch the UE between different RATs to adapt to a current state of the UE, because the cellular network does not have full and instant knowledge of the current state of the UE, such as a data condition, a power consumption condition and/or a thermal condition of the UE. In practice, some conditions are not instantly reported by the UE to the cellular network. Certain conditions (such as power consumption condition and/or thermal condition of the UE) are not reported by the UE to the cellular network, Therefore, the switch initiated by the cellular network may not always be optimal for the UE. RAT switch optimization is desired to improve the performance of the UE.

Figure 3:
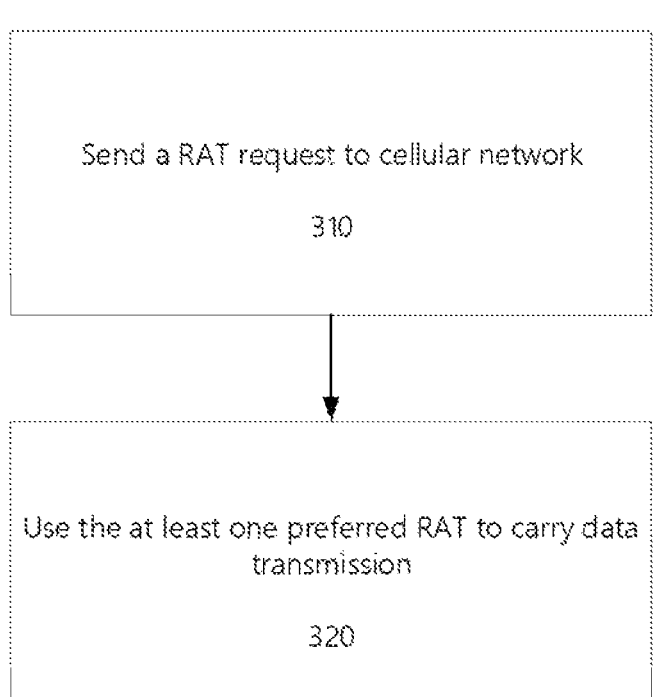
FIG. 3 illustrates a method for performing an optimized switch between different RATs, according to embodiments disclosed herein.

FIG. 3 illustrates a method 300 for performing an optimized switch between different RATs for a UE. Method 300 may be performed by any UE (e.g., wireless device 202) or any apparatus that may be able to control the UE disclosed herein.

Method 300 may begin with step 310, in which the UE may be configured to send a RAT request to the cellular network. The RAT request may be configured to indicate at least one RAT that is selected from the first RAT and the second RAT and is preferred by the UE.

Method 300 may then proceed to step 320, in which the UE may be configured to use the at least one preferred RAT to carry data transmission between the UE and the cellular network.

Method 300 allows for an optimized switch to the at least one preferred RAT of the UE. Such a switch is requested by the UE, which has full and instant knowledge of the state of the UE. Hence, the switch may be able to provide a RAT that is adaptive to the state of the UE.

According to an embodiment disclosed herein, the at least one preferred RAT may include one or both of the first RAT and the second RAT. In some cases, the at least one preferred RAT may indicate a single one RAT (namely, either the first RAT or the second RAT). In some cases, the at least one preferred RAT may indicate both the first RAT and the second RAT.

According to an embodiment disclosed herein, the second RAT may be 5G NR, which includes FR1 operations and FR2 operations. In this embodiment, when the at least one preferred RAT includes the second RAT, the RAT request may further indicate at least one preferred operation that is selected by the UE from the FR1 operations and FR2 operations. Accordingly, using the at least one preferred RAT to carry data transmission between the UE and the cellular network in step 320 may comprise using the at least one preferred operation selected from the FR1 operations and FR2 operations to carry data transmission between the UE and the cellular network.

According to an embodiment disclosed herein, the RAT request may be a recommendation by the UE to the cellular network. That is, upon receiving the RAT request from the UE, the cellular network may decide whether to accept or reject the RAT request of the UE. If the cellular network decides to accept the RAT request, the cellular network may send a confirmation to the UE. In response to receiving the confirmation from the cellular network, the UE may proceed to step 320 to use the at least one preferred RAT to carry data transmission between the UE and the cellular network. If the UE fails to receive the confirmation from the cellular network (for example, within a time threshold), the UE may not proceed to step 320.

In one implementation, the confirmation from the cellular network may be an explicit message sent by the cellular network. In another implementation, the confirmation from the cellular network may be implicit. For example, the cellular network may send a new configuration to the UE to configure connectivity and/or data transmission between the UE and the cellular network. The new configuration may be based on the at least one preferred RAT indicated in the RAT request. Therefore, the new configuration may act as an implicit confirmation to the RAT request.

According to another embodiment, the UE may proceed to step 320 without having to receive the confirmation from the cellular network.

According to various embodiments disclosed herein, the RAT request may take any appropriate form to indicate the at least one preferred RAT. In one implementation, the RAT request may indicate the at least one preferred RAT by including information associated with at least one RAT that is preferred by the UE. In an example, the RAT request may include an index or an identifier of the at least one preferred RAT, which is selected from a predefined set of indexes or identifiers of all the available RATs. In another implementation, the RAT request may indicate the at least one preferred RAT by including information associated with at least one RAT that is not preferred by the UE.

According to various embodiments disclosed herein, the RAT request may be sent via any appropriate message from the UE to the cellular network. In one implementation, the RAT request may be included along with other information in any existing message from the UE to the cellular network. In one example, the RAT request may be sent as a part of an assistance information from the UE to the cellular network. Specifically, the RAT request may be implemented as one or more information elements (IE) in the assistance information. In another example, the RAT request may be sent as a part of an RRC signaling (such as a configured measurement report) from the UE to the cellular network. In a further example, the RAT request may be sent as a part of a MAC CE message from the UE to the cellular network. In another implementation, a new separate message may be defined to include the RAT request. The new separate message may be sent from the UE to the cellular network.

According to an embodiment disclosed herein, the sending of the RAT request may be triggered by the UE based on a state of the UE. Specifically, the UE may be configured to monitor a state of the UE and determine whether the state of the UE satisfies one or more predetermined trigger criteria. In accordance with a determination that the state of the UE satisfies the one or more predetermined trigger criteria, the UE may send the RAT request. Therefore, the RAT request may be triggered by the UE without having to receiving a previous indication from the cellular network.

According to various embodiments disclosed herein, the state of the UE may be determined based on various conditions associated with the UE. Accordingly, the one or more predetermined trigger criteria may be associated with one or more of the various conditions. Exemplary conditions may include a data condition of the UE, a radio condition of the UE, a power consumption condition of the UE, a battery condition of the UE, a thermal condition of the UE, or any combination thereof.

According to an embodiment disclosed herein, the one or more predetermined trigger criteria may be based on a data condition of the UE. The data condition may include an amount of data to be transmitted or received by the UE and/or the expected data rate thereof. For example, if an amount of data to be transmitted or received by the UE and/or the expected data rate drops below one or more thresholds, the UE may trigger to send the RAT request to indicate at least a preferred RAT (e.g., LTE) that provides a potentially lower data bandwidth. The lower data bandwidth of LTE RAT may be sufficient to support the relatively small amount of data and/or low expected data rate, while avoiding relatively higher power consumption and thermal production associated with NR RAT. If an amount of data to be transmitted or received by the UE and/or the expected data rate exceeds the one or more thresholds, the UE may trigger to send the RAT request to indicate at least another preferred RAT (e.g., NR) that is able to provide a potentially greater data bandwidth. In a further embodiment, if a first threshold of the one or more thresholds is exceeded, the UE may trigger to send the RAT request to indicate the NR FR1 operations. If a second threshold higher than the first threshold is exceeded, the UE may trigger to send the RAT request to indicate the NR FR2 operations, which may provide an even greater data bandwidth than the NR FR1 operations.

In this embodiment, the UE may configure the one or more thresholds based on a peak data rate and/or a potential data bandwidth of the first RAT and the second RAT (in some embodiments, more specifically, FR1 and FR2 operations).

Also, in this embodiment, the UE may be configured to measure the amount of data to be transmitted based on an amount of data in the buffer for uplink (UL) transmission. Also, the UE may be configured to measure the amount of data to be received based on one or more applications running on the UE. For example, the UE may expect a high data rate if a streaming application is activated. Any other appropriate measurements may also be used to determine an amount of data to be transmitted or received by the UE and/or the expected data rate thereof.

According to an embodiment disclosed herein, the one or more predetermined trigger criteria may be based on a radio condition of the UE. The radio condition of the UE may be described by one or more parameters, such as Signal to Interference plus Noise Ratio (SINR), Reference Signal Received Power (RSRP), Channel Quality Indication (CQI), or any combination thereof. The UE may be able to measure the radio condition itself or receive measurement of the radio condition. Each of the first RAT and the second RAT (in some embodiments, more specifically, FR1 and FR2 operations) may have a respective measurement. Since NR may have smaller coverage than LTE, the UE may be configured to select NR as a preferred RAT only if the radio condition of NR is good enough (for example, when values of the one or more parameters associated with NR exceed one or more thresholds).

According to an embodiment disclosed herein, the one or more predetermined trigger criteria may be based on a power consumption condition of the UE. For example, if the UE determines that the power consumption of the UE exceeds one or more threshold, the UE may trigger to send the RAT request to indicate at least one preferred RAT (e.g., LTE) that requires less power consumption for the UE. In a further embodiment, if a first threshold of the one or more threshold is exceeded, the RAT request may indicate that only LTE is preferred. If the power consumption of the UE falls between the first threshold and a second threshold that is lower than the first threshold, the RAT request may indicate that either LTE or the NR FR1 operations may be preferred. If the power consumption of the UE falls below the second threshold, the RAT request may indicate that any of LTE, NR FR1 operations or NR FR2 operations may be preferred.

According to an embodiment disclosed herein, the one or more predetermined trigger criteria may be based on a battery condition of the UE. For example, if the UE determines that the battery of the UE drops below one or more threshold, the UE may trigger to send the RAT request to indicate at least one preferred RAT (e.g., LTE) that requires less power consumption for the UE. More specifically, if the battery of the UE drops below a first threshold of the one or more threshold, the RAT request may indicate that only LTE is preferred. If the battery of the UE falls between the first threshold and a second threshold that is higher than the first threshold, the RAT request may indicate that either LTE or NR FR1 operations may be preferred. If the power consumption of the UE exceeds the second threshold, the RAT request may indicate that any of LTE, NR FR1 operations or NR FR2 operations may be preferred.

According to an embodiment disclosed herein, the predetermined trigger criterion may be triggered based on a thermal condition of the UE. For example, if the UE determines that the thermal condition of the UE is getting worse (for example, the temperature of at least one portion of the UE exceeds one or more thresholds), the UE may trigger to send the RAT request to indicate at least one preferred RAT (e.g., LTE) that produces less heat for the UE. More specifically, if the temperature of at least one portion of the UE exceeds a first threshold of the one or more threshold, the RAT request may indicate that only LTE is preferred. If the temperature of at least one portion of the UE falls between the first threshold and a second threshold that is lower than the first threshold, the RAT request may indicate that either LTE or NR FR1 operations may be preferred. If the temperature of at least one portion of the UE drops below the second threshold, the RAT request may indicate that any of LTE, NR FR1 operations or NR FR2 operations may be preferred.

According to an embodiment disclosed herein, determining the state of the UE satisfies the one or more predetermined trigger criteria may include filtering of measurements associated with one or more of the conditions before determining if the one or more predetermined trigger criteria are satisfied. The filtering of measurements may improve reliability and robustness, thereby avoiding Ping-Pong issues that would otherwise lead to frequent switches between RATs.

In one example, the filtering may include filtering out one or more outliers of a series of measurements or reducing effect of the outliers. A filter may be applied to the series of measurements. For example, the UE may be configured to calculate an average value of the series of measurements. The calculated average value may be used to determine if the predetermined trigger criterion is satisfied for that measurement. For example, the calculated average value may be compared to one or more thresholds. Other filters may also be used.

In another example, the filtering may include determining if measurement related to a preferred RAT is better than measurement related to a RAT that is currently used between the UE and the cellular network. The UE may send the RAT request if measurement related to the preferred RAT is determined to be better by at least a predetermined threshold and/or for at least a predetermined period. If measurement related to the preferred RAT is not good enough, or if good measurement related to the preferred RAT does not last for a sufficient period, the UE may not send the RAT request but remain the currently used RAT. The predetermined threshold and/or the predetermined period may be configurable.

Although various conditions have been discussed above, it is appreciated that other conditions about the UE may be additionally or alternatively considered. The conditions may be considered alone or in any combination. For example, the power consumption, battery condition or thermal condition may be considered in combination with the data condition, to ensure the data transmission of the UE can be supported while minimizing the power consumption of the UE.

According to various embodiments disclosed herein, the second RAT may be implemented with a variety of NR deployment alternatives. In one implementation, the second RAT may be implemented with a NSA (Non-Stand Alone) deployment. In another implementation, the second RAT may be implemented with a SA (Stand Alone) deployment. As discussed below, different NR deployment alternatives may lead to different implementations of the disclosure.

According to an embodiment disclosed herein, using the at least one preferred RAT to carry data transmission between the UE and the cellular network in step 320 may include using the at least one preferred RAT to carry Data Radio Bearer (DRB) for the data transmission between the UE and the cellular network. In this case, the Data Radio Bearer (DRB) for the data transmission are changed in step 320, but connections for both the first RAT and the second RAT may be maintained.

Figure 4:
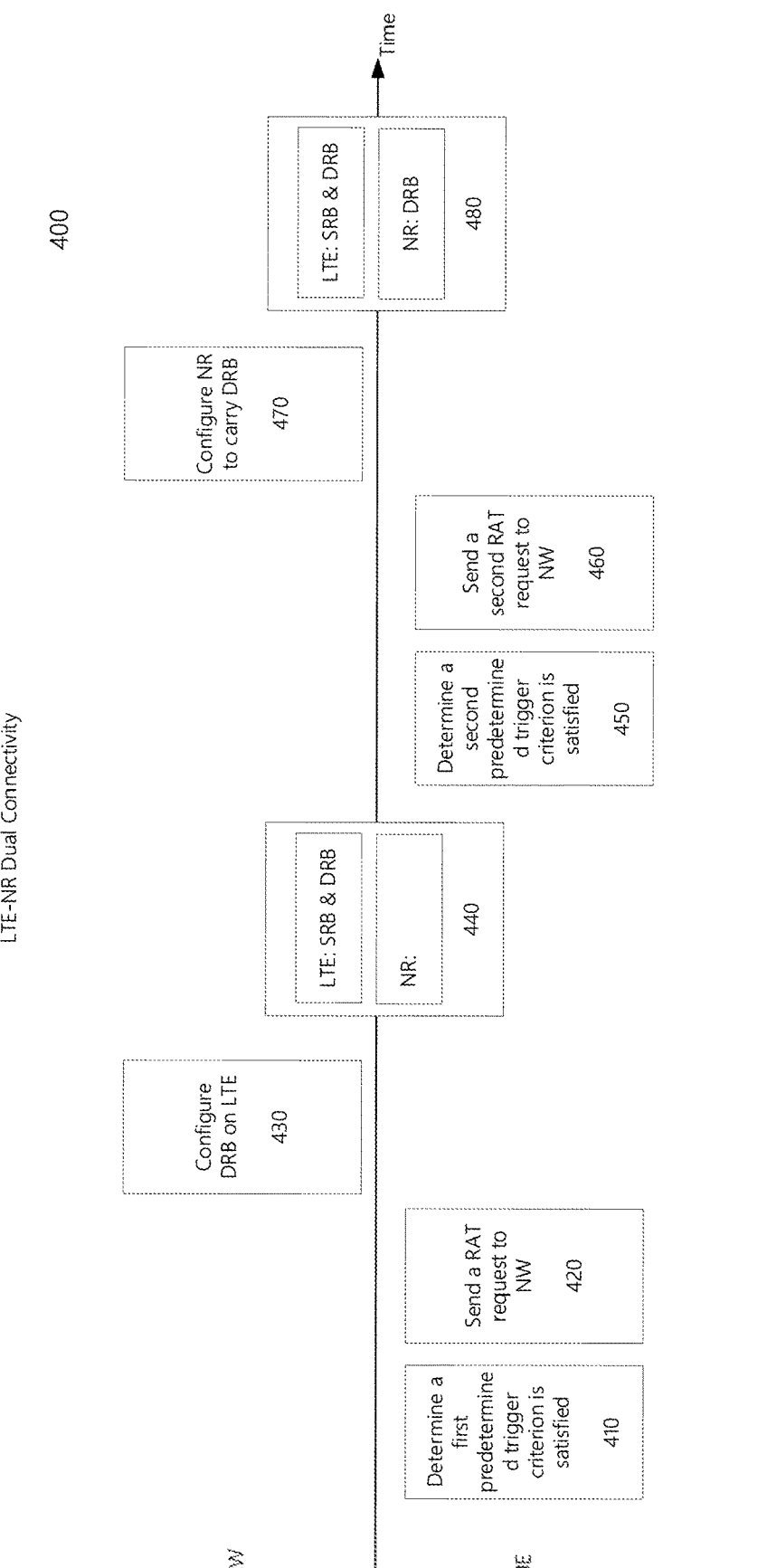
FIG. 4 illustrates an exemplary switch procedure where DRB may be changed in response to a RAT request, according to embodiments disclosed herein.

FIG. 4 illustrates an exemplary switch procedure 400 where the DRB may be changed in response to the RAT request. Switch procedure 400 is discussed with respect to dual connectivity of LTE and NR. The UE may be initially in LTE-NR dual connectivity with the cellular network (also shown as "NW").

At step 410, the UE may determine that a first predetermined trigger criterion is satisfied. The first predetermined trigger criterion may include, for example, an expected data rate of the UE dropping below one or more thresholds. It is appreciated that the first predetermined trigger criterion may include any other suitable conditions, for example, those described above.

In response to a determination that the first predetermined trigger criterion is satisfied, the UE may send, at step 420, a RAT request to the cellular network to indicate that LTE is a preferred RAT. LTE is preferred by the UE in this condition, because the relatively smaller data bandwidth of LTE may be sufficient to support the expected data rate, and LTE is more reliable and causes less power consumption and thermal issue for the UE.

Upon receiving the RAT request from the UE, the cellular network may decide to accept the RAT request. Accordingly, the cellular network may, at step 430, configure the Data Radio Bearer (DRB) on the LTE connection. No DRB may be configured on the NR connection. Upon receiving the configuration from the cellular network, the UE may be prepared to use DRB on the LTE connection.

At step 440, the UE and the cellular network may use the DRB carried on the LTE connection to perform data transmission (e.g., downlink data and/or uplink data transmission) between the UE and the cellular network. Although the NR connection may be still maintained, the NR connection does not carry any DRB. Therefore, the power consumption and possible thermal issues associated with data transmission on the NR connection may be reduced.

At step 450, the UE may determine that a second predetermined trigger criterion is satisfied. The second predetermined trigger criterion may include, for example, an expected data rate exceeding the one or more thresholds.

The second predetermined trigger criterion may include any other suitable conditions, for example, those described above.

In response to a determination that the second predetermined trigger criterion is satisfied, the UE may send, at step 460, a second RAT request to the cellular network to indicate that NR is a preferred RAT. NR becomes the preferred RAT, because the relatively smaller data bandwidth of LTE may not be sufficient to support the expected data rate exceeding the one or more thresholds.

Upon receiving the second RAT request from the UE, the cellular network may decide to accept the second RAT request. Accordingly, the cellular network may, at step 470, configure the NR connection to carry the DRB. Upon receiving the configuration from the cellular network, the UE may be prepared to use DRB on the NR connection.

At step 480, the NR connection may carry the configured DRB. The DRB on the NR connection may be used to carry at least a portion of data transmission between the UE and the cellular network. The DRB on the NR connection may be able to provide a relatively greater data bandwidth to support the expected data rate.

The LTE connection may be still maintained at step 480. In one implementation, the LTE connection may still carry DRB that supports at least a portion of data transmission between the UE and the cellular network, as shown in FIG. 4. In another implementation (not shown), the DRB may be configured on the NR connection only and the LTE connection may no longer carry any DRB at step 480.

Note that FIG. 4 is illustrated based on the NR NSA deployment, in which a Signaling Data Bearer (SRB) cannot be carried by the NR connection. Accordingly, at steps 440 and 480, the SRB is carried on the LTE connection. In an alternative embodiment where the NR SA deployment is utilized, the SRB can be carried by the NR connection. In that embodiment, the SRB may be carried on the NR connection instead of the LTE connection at step 480.

According to another embodiment, using the at least one preferred RAT to carry data transmission between the UE and the cellular network in step 320 may include maintaining a connection of the at least one preferred RAT between the UE and the cellular network and releasing a connection of any RAT of the first RAT and the second RAT other than the at least one preferred RAT.

Figure 5:
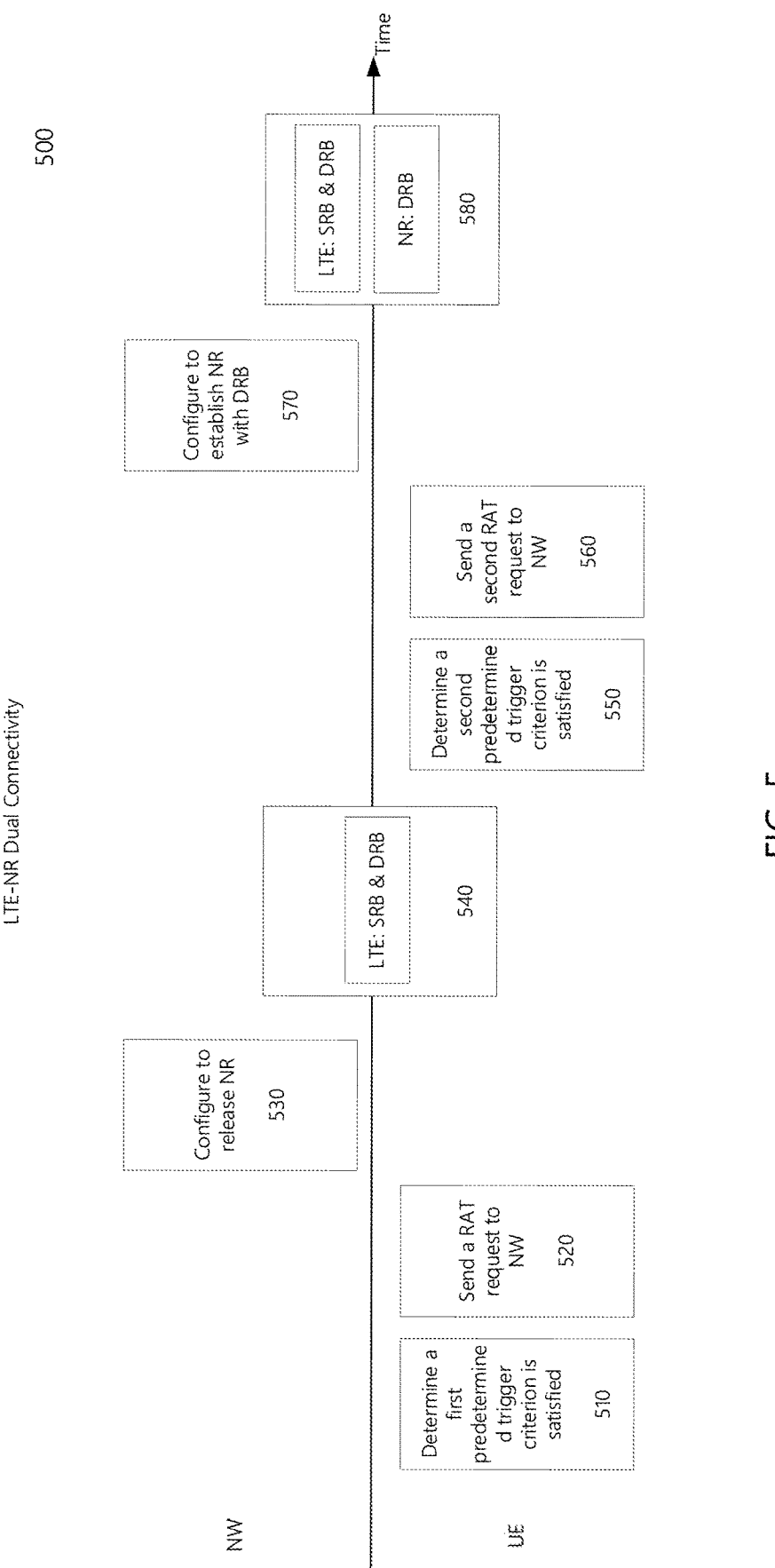
FIG. 5 illustrates an exemplary switch procedure where one of the connections may be released in response to a RAT request, according to embodiments disclosed herein.

FIG. 5 illustrates an exemplary switch procedure 500 where one of the connections may be released in response to a RAT request. Switch procedure 500 is discussed with respect to dual connectivity of LTE and NR. The UE may be initially in LTE-NR dual connectivity with the cellular network.

At step 510, the UE may determine that a first predetermined trigger criterion is satisfied. The first predetermined trigger criterion may include, for example, an expected data rate dropping below one or more thresholds. It is appreciated that the first predetermined trigger criterion may include any other suitable conditions, for example, those described above.

In response to a determination that the first predetermined trigger criterion is satisfied, the UE may send, at step 520, a RAT request to the cellular network to indicate that LTE is a preferred RAT.

Upon receiving the RAT request from the UE, the cellular network may decide to accept the RAT request. Accordingly, the cellular network may, at step 530, configure to maintain the LTE connection and release the NR connection between the UE and the cellular network. Upon receiving the configuration from the cellular network, the UE may accordingly maintain the LTE connection and release the NR connection between the UE and the cellular network.

At step 540, only the LTE connection is still maintained between the UE and the cellular network, and the NR connection has been released. Data transmission between the UE and the cellular network is carried on the LTE connection (more specifically, on the DRB on the LTE connection). Therefore, the power consumption and possible thermal issues associated with the NR connection may be avoided.

At step 550, the UE may determine that a second predetermined trigger criterion is satisfied. The second predetermined trigger criterion may include, for example, an expected data rate exceeding the one or more thresholds. The second predetermined trigger criterion may include any other suitable conditions, for example, those described above.

In response to a determination that the second predetermined trigger criterion is satisfied, the UE may send, at step 560, a second RAT request to the cellular network to indicate that NR is a preferred RAT.

Upon receiving the second RAT request from the UE, the cellular network may decide to accept the second RAT request. Accordingly, the cellular network may, at step 570, configure to establish the NR connection between the UE and the cellular network. The cellular network may also configure the NR connection to carry DRB for at least a portion of data transmission between the UE and the cellular network. Upon receiving the configuration from the cellular network, the UE may accordingly establish the NR connection with DRB configured thereon.

At step 580, the NR connection has been established between the UE and the cellular network and may carry at least a portion of data transmission between the UE and the cellular network. The portion of data transmission may be carried on the DRB on the NR connection. The NR connection may be able to provide a relatively greater data bandwidth to support the expected data rate.

In one implementation, the LTE connection may be still maintained at step 580. For example, the NR NSA deployment requires the LTE connection to carry the SRB, so the LTE connection should be maintained. In this implementation, each of the RAT request and the second RAT request may be deemed as a selection regarding whether to release or establish the NR connection. As a result, both LTE connection and NR connection are maintained at step 580, and the NR connection is configured with DRB. In one example, the LTE connection may also carry DRB that supports at least a portion of data transmission between the UE and the cellular network, as shown at step 580 in FIG. 5. In another example (not shown), the LTE connection may not carry DRB at step 580. That is, the DRB may be configured on the NR, connection only.

In another implementation, the RAT request and the second RAT request may be deemed as a selection of a single RAT. In this implementation, in response to a selection of NR at step 560, the LTE connection may be released at step 570. Therefore, only the NR, connection is maintained at step 580. This implementation may be implemented with the NR. SA deployment, in which the NR connection is able to carry SRB. With this implementation, power consumption associated with the LTE connection may be avoided at step 580.

With switch procedure 500, the UE is able to request to operate only in LTE, operate in LTE-NR dual connectivity, or even operate only in NR (with SA deployment). As compared to switch procedure 400, switch procedure 500 allows one of the connections to be released and thus provides a greater reduction of power consumption for the UE.

According to a further embodiment, at step 460 or at step 560, the UE may be configured to send the second RAT request to specifically indicate a preferred NR operation from NR FR1 operations and NR FR2 operations. For example, if the second predetermined trigger criterion detected at step 450 or 550 indicates a very high expected data rate, NR FR2 operations may be preferred. If the second predetermined trigger criterion indicates a less high expected data rate, NR FR1 operations may be preferred. Accordingly, the cellular network and the UE may use the indicated NR operations to carry data transmission at step 480 or step 580.

Although FIG. 4 and FIG. 5 describe that the UE is initially in dual connectivity with the cellular network, it is appreciated that the UE may be able to send the RAT requests to the cellular network regardless whether the UE is initially in dual connectivity with the cellular network. For example, as discussed in step 560, the UE sends the second RAT request when only the LTE connection is maintained between the UE and the cellular network. In some cases, the UE may only maintain the NR connection. In this condition, the UE may also send a RAT request if one or more predetermined trigger criteria are satisfied.

In addition to the RAT requests described in FIG. 4 and FIG. 5, the UE may send one or more additional RAT requests (not shown) to the cellular network to indicate at least one updated RAT selected from the first RAT and the second RAT. Accordingly, the UE may use the at least one updated RAT to carry data transmission between the UE and the cellular network. In some cases, the at least one updated RAT may be different from the previously preferred RAT. For example, after step 480 or 580, the UE may send one or more additional RAT requests, which may indicate that the UE prefers one or more actions about the NR connection, such as stopping the NR connection, keeping the NR connection but stopping DRB on NR, starting the NR connection with DRB configured on NR, or keeping the NR connection with DRB configured on NR. The one or more additional RAT requests may further specifically indicate the UE's preferences about NR FR1 operations or FR2 operations, including preferring FR1 operations only, preferring FR2 operations only, or preferring both of FR1 operations and FR2 operations. Similar to the embodiments described above, the UE may use the new preferred RAT for data transmission between the UE and the cellular network.

Figure 6:
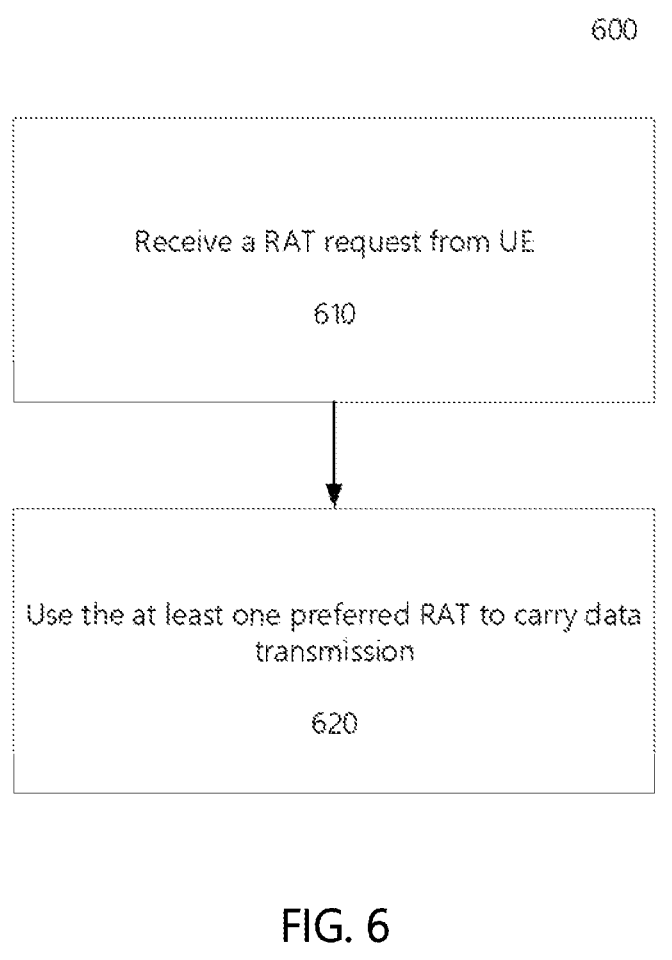

FIG. 6 illustrates a method 600 for performing an optimized switch between different RATs for the UE. Method 600 may be performed by a network device (e.g., network device 218) of the cellular network or any apparatus that may be able to control or represent the cellular network disclosed herein.

Method 600 may begin with step 610, in which the cellular may be configured to receive a RAT request from the UE. The RAT request may be configured to indicate at least one RAT that is selected from the first RAT and the second RAT and is preferred by the UE.

Method 600 may then proceed to step 620, in which the cellular network may be configured to use the at least one preferred RAT to carry data transmission between the UE and the cellular network.

According to an embodiment disclosed herein, the RAT request may be a soft recommendation by the UE to the cellular network. In this embodiment, upon receiving the RAT request from the UE, the cellular network may be configured to decide whether to accept or reject the RAT request of the UE. If the cellular network decides to accept the RAT request, the cellular network may send a confirmation to the UE. After that, the cellular network may proceed to step 620 to use the at least one preferred RAT to carry data transmission between the UE and the cellular network. If the cellular network decides not to accept the RAT request, the cellular network may not send the confirmation to the UE and may not proceed to step 620.

According to an embodiment disclosed herein, method 600 may further include one or more actions described above for the cellular network.

With the mechanism disclosed herein, according to some embodiments, the UE may be able to request which RAT of LTE and NR is preferred to carry the DRB. When the requested RAT includes FR1 and FR2 operations, the UE may be able to specifically request whether NR FR1 or NR FR2 should carry the data scheduling (Proposal 1.1).

With the mechanism disclosed herein, according to some embodiments, the UE may be able to request to operate only in LTE, only in NR or in dual RATs (Proposal 1.2). This may provide a greater reduction of power consumption of the UE.

With the mechanism disclosed herein, according to some embodiments, the UE may request to switch DRB between different RATs (or even between NR FR1 and NR FR2), or may request to operate only in LTE, only in NR or in dual RATs based on the state of the UE, which may be associated with at least one factor of: the amount of data in the buffer of the UE, the amount of data the UE is expecting, the radio condition (such as SINR, RSRP or CQI), the expected data rate, the UE power consumption/battery condition, or the UE thermal condition. In addition, to avoid Ping-Pong issues, the UE may use filtering to filter measurements of the one or more of the factors to improve reliability and robustness. A hysteresis that the measurement of a new decision should be better than the measurement of the old decision by a certain configurable threshold may be further considered before trigger the switch. Also, time to trigger is also considered, which means that the measurement of a new decision should be better than the measurement of the old decision for a configurable amount of time before the switch can be triggered (Proposal 1.3).

With the mechanism disclosed herein, the UE can use the request to indicate to the cellular network (for example, as assistance information) one or multiple of the following: UE prefers to stop the NR connection, UE prefers to keep the NR connection but stop DRB on NR, UE prefers to start or keep the NR connection with DRB also configured on NR (which further indicates that UE prefers NR FR1 operations only, UE prefers NR FR2 operations only, or UE prefers both NR FR1 and FR2 operation2) (Proposal 1.4).

Although this disclosure mainly discusses LTE and NR above, it is appreciated the dual connectivity of the UE are not limited thereto. In other embodiments, the dual connectivity of the UE may include any other appropriate RAT, such as any RAT for a future generation of 3GPP standards.

Lean FR2 Operations

An advanced UE may be able to operate in both NR FR1 band and NR FR2 band. Although NR FR2 operations provide a greater available data bandwidth than NR FR1 operations, NR FR2 operations are challenging because of low reliability, small coverage, high power consumption and thermal issues of the UE. From the perspective of the UE, it may be preferred to disable or minimize NR FR2 operations as much as possible.

According to various embodiments disclosed herein, lean FR2 operations may be defined, which may provide one or more improvement or modification to standard FR2 operations. As compared to standard FR2 operations, lean FR2 operations may cause less overhead for the UE. For example, lean FR2 operations may require less allocated resources and cause less power consumption for the UE. When operating in NR, the UE may request to switch to the lean FR2 operations.

FIG. 7 illustrates a method 700 for requesting a preferred configuration of the UE. Method 700 may be performed by any UE (e.g., wireless device 202) or any apparatus that may be able to control or represent the UE disclosed herein.

Method 700 may begin with step 710, in which the UE may be configured to transmit a Scheduling Request (SR) to a cellular network to indicate a particular configuration preferred by the UE. In NR, the SR is generally used by the UE to request the cellular network to allocate resources (e.g., uplink grant) for uplink transmission (e.g., PUSCH transmission).

According to an embodiment disclosed herein, the particular configuration preferred by the UE may include at least one of: whether the UE prefers to have grant in the NR FR1 band or the NR FR2 band; a number of Component Carriers (CCs) the UE prefers to be scheduled; or one or more specific CCs of all available CCs the UE prefers to be scheduled.
(Proposal 2.1)

According to various embodiments disclosed herein, the UE may be configured to determine the preferred particular configuration based on various conditions. For example, the conditions may include a data condition of the UE, a radio condition of the UE, power consumption of the UE, a battery condition of the UE, a thermal condition of the UE, or any combination thereof.

In one embodiment, the particular configuration preferred by the UE may indicate whether the UE prefers to have grant in the NR FR1 band or the NR FR2 band. The UE may determine whether it prefers to have grant in the NR FR1 band or the NR FR2 band based on one or more of the above listed various conditions. Note that NR FR2 operations provide higher available data bandwidth with the cost of higher power consumption, smaller coverage and less reliable connection. In some embodiment, the UE may prefer to have grant in the NR FR1 band when the UE detects that the radio condition is not sufficient for reliable FR2 operations. In some embodiments, the UE may always prefer to have grant in the NR FR1 band. Only if the data amount and/or the expected data rate exceeds one or more thresholds, the UE may prefer to have grant in the NR FR2 band.

In this embodiment, upon receiving the SR from the UE, the cellular network may be configured to configure grant in the NR FR1 band or the NR FR2 band and provide the grant to the UE, as requested by the UE.

As an additional or alternative embodiment, the particular configuration preferred by the UE may further indicate a number of Component Carriers (CCs) the UE prefers to be scheduled. In NR, the cellular network is able to allocate a set of CCs to the UE. However, the whole set of CCs allocated by the cellular network may be too many for UE's transmission. To avoid waste of resources and reduce power consumption, the UE may recommend, to the cellular network, a specific number of CCs the UE prefers to be scheduled. The specific number of CCs may be less than the total number of the set of CCs that are configured by the cellular network. In this manner, the UE may be able to avoid activating too many CCs for NR operations (especially, NR FR2 operations), while ensuring the performance.

In this embodiment, upon receiving the SR from the UE, the cellular network may be configured to activate the requested number of CCs and provide the configuration to the UE.

As an additional or alternative embodiment, the particular configuration preferred by the UE may further indicate one or more specific CCs of all available CCs the UE prefers to be scheduled. The one or more specific CCs may be a subset selected from the whole set of CCs allocated by the cellular network. For example, the one or more specific CCs may be selected as one or more CCs that have good performance from all available CCs in the allocated set of CCs. By recommending a reduced subset of CCs that have good performance, the UE may be able to activate less CCs while ensuring the performance.

In this embodiment, upon receiving the SR from the UE, the cellular network may be configured to activate the requested one or more specific CCs and provide the configuration to the UE.

According to an embodiment disclosed herein, transmitting the SR to indicate the particular configuration preferred by the UE in step 710 may comprise differentiating one or more parameters associated the SR based on the particular configuration preferred by the UE. The one or more parameters may include at least one of a sequence, a time slot or a frequency associated the SR. For example, a first SR may be associated with a first set of one or more parameters, thereby indicating that the UE prefers to have grant in the NR FR1 band. A second SR may be associated with a different second set of one or more parameters, thereby indicating that the UE prefers to have grant in the NR FR2 band. Also, each possible number of CCs the UE prefers to be scheduled may correspond to a respective SR associated with a respective set of one or more parameters. In addition, each uplink CC or each subset of uplink CCs may correspond to a respective SR associated with a respective set of one or more parameters. In this manner, each possible configuration may be mapped to a respective SR, which will be sent to the cellular network to indicate that preferred configuration.

In uplink direction, PUCCH is used to transmit SR and HARQ-ACK information from the UE to the cellular network. In NR where FR1 and FR2 operations may be both utilized, the cellular work may configure two respective PUCCH groups, each group for FR1 operations and FR2 operations. Specifically, the cellular network may configure a first PUCCH group for all the Uplink Control Information (UCI) needed for CCs in the NR FR1 band and configure a second PUCCH group for all the UCI needed for CCs in the NR FR2 band. For standard operations, SR and HARQ-ACK information for the NR FR1 band may be carried in the first PUCCH group, and SR and HARQ-ACK information for the NR FR2 band may be carried in the second PUCCH group.

According to an embodiment disclosed herein, the UE may be configured to send a first indication to the cellular network to stop the second PUCCH group. The first indication may be triggered in various conditions. For example, the UE may send the first indication when detecting the power consumption of the UE exceeds a first power consumption threshold, or the battery of the UE drops below a first battery threshold, or the temperature of at least a portion of the UE exceeds a first temperature threshold. Stopping the second PUCCH group may lead to lean FR2 operations that require less power consumption and causes fewer thermal issues for the UE.

In this embodiment, when the second PUCCH group is stopped, the UE may be configured to automatically map HARQ-ACK for all downlink CCs in the NR FR2 band to the first PUCCH group for NR FR1 band (Proposal 2.2). Specifically, HARQ-ACK for downlink CCs in the NR FR2 band may be multiplexed with HARQ-ACK for downlink CCs in the NR FR1 band. The multiplexed HARQ-ACK may be carried in the first PUCCH group for NR FR1 band to the cellular network. Also, when the second PUCCH group is stopped, the cellular network cannot configure P/SP-CSI on PUCCH in the NR FR2 band.

According to an embodiment disclosed herein, the UE may be configured to send a second indication to the cellular network to stop all UL operations of the FR2 operations. The second indication may be triggered in various conditions. For example, the UE may send the second indication when detecting the power consumption of the UE exceeds a second power consumption threshold (which may be higher than the first power consumption threshold), or the battery of the UE drops below a second battery threshold (which may be lower than the first battery threshold), or the temperature of tat least a portion of the UE exceeds a second temperature threshold (which may be higher than the temperature threshold). Stopping all UL operations of the FR2 operations may lead to lean FR2 operations that require even less power consumption and causes even fewer thermal issues for the UE.

In this embodiment, the UE may be configured to take one or more actions to stop all UL operations of the FR2 operations. For example, the UE may be configured to map HARQ-ACK for all downlink CCs in the NR FR2 band to the first PUCCH group for NR FR1 band; release or deactivate all configured SR, SRS and RACH in the NR FR2 band; release all configured P-CSI in the NR FR2 band; deactivate all activated SP-CSI in the NR FR2 band; release or deactivate all configured or activated CG PUSCH in the NR FR2 band (Proposal 2.3). Also, when all UL operations of the FR2 operations are stopped, the cellular network cannot dynamically trigger AP-CSI or PUSCH or AP-SRS in NR FR2 band via DCI.

According to an embodiment disclosed herein, each of the SR. (configured based on a preferred configuration of the UE), the first indication or the second indication may be a recommendation by the UE to the cellular network. That is, upon receiving the recommendation from the UE, the cellular network may decide whether to accept or reject the soft recommendation. If the cellular network decides to accept the soft recommendation, the cellular network may send a confirmation to the UE. In response to receiving the confirmation from the cellular network, the UE may proceed to follow the recommendation. If the UE fails to receive the confirmation from the cellular network (for example, within a time threshold), the UE may discard the recommendation and follow the configuration provided by the cellular network. The confirmation from the cellular network may be explicit or implicit.

According to an embodiment disclosed herein, the cellular network can configure lean FR2 operations without UL. For example, the cellular network may configure UL Bandwidth Part (BWP) for dormancy operation. Alternatively, the cellular network may configure DL BWP without associated UL BWP. In an implementation, the cellular network may trigger, via DCI, the UE to switch to UL BWP for dormancy operation after receiving the DCI. The UE may optionally feedback HARQ-ACK to acknowledge the reception. Also, UE may suspend or stop all UL operation in the corresponding UL CC (Proposal 2.4).

According to an embodiment disclosed herein, multiple configured grant PUSCH (CG PUSCH) may be configured in the NR FR1 band and the NR FR2 band. Two or more of the multiple CG PUSCH may collide with each other. For example, a time slot allocated to a first CG PUSCH may overlap with a time slot allocated to a second CG PUSCH. The collision may be solved based on priority of the colliding first and second CG PUSCH. In one example, the priority of a CG PUSCH may be determined based on whether the CG PUSCH is associated with an URLLC (Ultra Reliable Low Latency Communications) transmission. If the CG PUSCH is associated with an URLLC transmission, the CG PUSCH may be assigned a high priority. Otherwise, the CG PUSCH may be assigned a low priority. In other examples, other aspect than the URLLC transmission may also be considered in determining priority of a CG PUSCH.

In this embodiment, the NR band (namely, the NR FR1 band or the NR FR2 band) in which the CG PUSCH is configured may be further considered. For example, a first CG PUSCH configured in the NR FR1 band and a second CG PUSCH configured in the NR FR2 band may collide with each other, but the first CG PUSCH and the second CG PUSCH may have a same priority level with respect to URLLC transmission. In this case, in response to a determination that the first CG PUSCH configured for the NR FR1 band and the second CG PUSCH configured for the NR FR2 band have a same priority level, the UE may be configured to prioritize the first CG PUSCH configured for the NR FR1 band over the second CG PUSCH configured for the NR FR2 band (Proposal 2.5). As a result of the prioritization, the first CG PUSCH configured for the NR FR1 band may be allowed to occupy the resources (for example, the time slot) and the second CG PUSCH configured for the NR FR2 band may not be able to use those resources.

According to an embodiment disclosed herein, multiple Scheduling Requests (SRs) may be configured in the NR FR1 band and the NR FR2 band. Two or more of the multiple SRs may collide with each other. For example, a time slot allocated to a first SR may overlap with a time slot allocated to a second SR. The collision may be solved based on priority of the colliding first and second SRs. Priority of an SR may also depend on whether the SR is associated with an URLLC transmission or any other appropriate factors.

In this embodiment, the NR band (namely, the NR FR1 band or the NR FR2 band) in which the SR, is configured may be further considered. For example, a first SR configured in the NR FR1 band and a second SR configured in the NR FR2 band may collide with each other, but the first SR and the second SR may have a same priority level with respect to URLLC transmission. In this case, in response to a determination that the first SR configured for the NR FR1 band and the second SR configured for the NR FR2 band have a same priority level, the UE may be configured to prioritize the first SR configured for the NR FR1 band over the second SR configured for the NR FR2 band (Proposal 2.6). As a result of the prioritization, the first SR configured for the NR FR1 band may be allowed to occupy the allocated resources (for example, the time slot) and the second SR configured for the NR FR2 band may not be able to use those resources.

With the mechanism disclosed herein, the UE is able to indicate a preferred configuration regarding NR operations to the cellular network. The indication may be made based on the state of the UE and thus reflect a particular configuration that is adaptive to the state of the UE.

With the mechanism disclosed herein, the UE is able to request to switch to lean FR2 operations, which may provide a reduction of power consumption for the UE. Different levels of lean FR2 operations are provided, including corresponding actions of the UE and the cellular network. The UE is able to request to switch to a specific level of lean FR2 operations based on different states of the UE.

Panel Management for UE

An advanced UE may include a plurality of antenna panels that are able to support the NR FR2 band. The NR FR2 band is a wide band that spans across 24.25 GHz to 52.6 GHz. The NR FR2 band may include several sub-bands, such as a 26 GHz sub-band (e.g., 24250-27500 MHz), a 28 GHz sub-band (e.g., 26500-29500 MHz) and a 39 GHz sub-band (e.g., 37000-40000 MHZ).

An antenna panel of the plurality of antenna panels of the UE, when activated, may not be able to support all of the sub-bands of the NR FR2 band. For example, an activated antenna panel may not be able to simultaneously transmit in both of the second 28 GHz sub-band and the 39 GHz sub-band, given that the frequency gap between these sub-bands is significant. In other words, the antenna panel may be activated to operate in either the second sub-band or the third sub-band.

Besides, not all of the plurality of antenna panels of the UE are activated during communication. For saving of power, some of the antenna panels may be deactivated.

Also, the plurality of antenna panels of the UE may be deployed at different positions on the UE with different orientations.

A specific configuration of the plurality of antenna panels of the UE may dramatically affect the communication performance between the UE and the cellular network. The specific configuration of the plurality of antenna panels may include at least one of: whether the UE may have a plurality of antenna panels, which of the plurality of antenna panels are currently activated, and the optimal frequency (e.g., the sub-band) for each activated antenna panel. The cellular network generally does not have knowledge of this specific configuration of the antenna panels of the UE. It may be advantageous for the UE to conduct panel management for improved performance.

Figure 8:
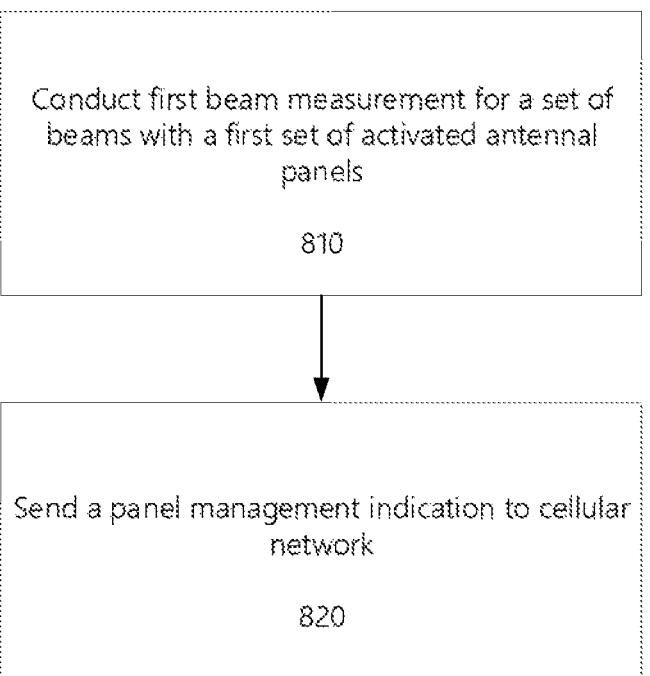
FIG. 8 illustrates a method of the UE for performing panel management, according to embodiments disclosed herein.

FIG. 8 illustrates a method 800 of the UE for performing panel management. Method 800 may be performed by any UE (e.g., wireless device 202) or any apparatus that may be able to control or represent the UE disclosed herein.

Method 800 may begin with step 810, in which the UE may be configured to conduct first beam measurement for a set of beams with a first set of activated antennal panels. The first beam measurement for the set of beams may be a part of a beam sweep procedure between the UE and the cellular network.

According to an embodiment disclosed herein, the first set of activated antennal panels may include one or more antennal panels that are activated. The one or more activated antennal panels may be a subset of a plurality of antennal panels of the UE. Usually, the one or more antennal panels used for initial beam measurement may include a single antenna panel of the UE.

According to an embodiment disclosed herein, the set of beams may be scheduled, by the cellular network, on a first set of resources. The first set of resources may include one or more time-frequency resources, such as a frequency allocated to a Component Carrier (CC) associated with a respective one of the set of beams.

According to an embodiment disclosed herein, through the first beam measurement, the UE may be able to determine values of one or more parameters for each of the set of beams. The one or more parameters, for example, may include one or more of SSB Resource Indicator (SSBRI), CSI-RS Resource Indicator (CRI), Signal to Interference plus Noise Ratio (SINR), or Reference Signal Received Power (RSRP) associated with each beam.

Method 800 may then proceed to step 820, in which the UE may be configured to send a panel management indication to the cellular network. For example, the panel management indication may indicate, to the cellular network, that the UE have more than one antenna panel and/or the UE prefers to switch to a different set of activated antenna panels and conduct additional beam measurement.

According to various embodiments disclosed herein, the UE may be configured to send the panel management indication via different messages from the UE to the cellular network.

In one implementation, the UE may be configured to send the panel management indication via a beam report for the first beam measurement. In an example, the UE may send the panel management indication via L1 beam management report. Specifically, the UE may configure the SSBRI field or the CRI field to have an invalid value or an out-of-range value. Alternatively, the UE may configure the L1-SINR field or the L1-RSRP field to have a reserved value.

Table 1 and Table 2 below illustrate the characteristics of these fields as defined in 3GPP Release 15 and Release 16.

TABLE 1

| CRI, SSBRI, and RSRP | |
|---|---|
| Field | Bitwidth |
| CRI | $\lceil \log_2(K_s^{CSI\text{-}RS}) \rceil$ |
| SSBRI | $\lceil \log_2(K_s^{SSB}) \rceil$ |
| RSRP | 7 |
| Differential RSRP | 4 |

TABLE 2

| CRI, SSBRI, and SNIR | |
|---|---|
| Field | Bitwidth |
| CRI | $\lceil \log_2(K_s^{CSI\text{-}RS}) \rceil$ |
| SSBRI | $\lceil \log_2(K_s^{SSB}) \rceil$ |
| SNIR | 7 |
| Differential SNIR | 4 |

According to the 3GPP standards, the SSBRI field or the CRI field may be assigned a specified value range. Each value within the specified value range may be deemed valid for that field. The bitwidth allocated to these fields still allows for one or more invalid values or out-of-range values, which may be used by the panel management indication disclosed herein.

According to the 3GPP standards, in addition to one or more valid values, the SNIR field or the RSRP field may be assigned one or more reserved values. The one or more reserved values may be also used by the panel management indication disclosed herein.

As described above, the invalid value, the out-of-range value, or the reserved value of one or more of these fields may act as an implicit form of the panel management indication. By reporting it to the cellular network via a standard beam measurement report, the UE may be able to implicitly inform the cellular network that the UE have more than one antenna panel, without any additionally defined message. Additionally, the panel management indication may also indicate to the cellular network that the UE prefers additional beam measurement with a different set of activated antenna panels of the plurality of antennal panels. As a specific example, the UE may send a panel management indication for Rx beam sweep by NZP-CSI-RS-ResourceSet with repetition set to "on" via L1 beam management report (Proposal 3.1).

In another implementation, the UE may be configured to send the panel management indication via any specifically defined message from the UE to the cellular network.

According to an embodiment disclosed herein, after step 820, the UE may be further configured to conduct the additional beam measurement with a second set of activated antenna panels. The second set of activated antenna panels may be different from the first set of activated antennal panels used for the first beam management.

For example, the cellular network, after receiving the panel management indication sent in step 810, may be configured to initiate the additional beam measurement with the UE. Since the cellular network now become aware that the UE have more than one antenna panel, the cellular network may allocate more resources for the additional beam measurement. A second set of resources may be allocated for the additional beam measurement.

On the UE side, the UE may be configured to activate a second set of antenna panels for the additional beam measurement. Preferably, the second set of activated antenna panels may contain more antenna panels than the first set of activated antenna panels. For example, the second set of activated antenna panels may include all of the plurality of antenna panels the UE may have. Therefore, the additional beam measurement may involve every antenna panel and the best antenna panel may be determined.

According to an embodiment disclosed herein, in step 820, in addition to the SSBRI and the CRI, the UE may be configured to report a corresponding cell ID (namely, SCellIndex) for a Component Carrier (CC) and/or a physical cell ID (namely, PCI) (Proposal 3.2) in the L1 beam management report. For example, the UE may be configured to report these two parameters for each beam if that beam has quality below a threshold. Reporting the corresponding cell ID allows for identifying a specific frequency (which is associated with the CC) that results in low beam quality. Reporting the physical cell ID allows for identifying a specific cell (of more than one cell on which the UE may reside) that results in low beam quality. The identified frequency and/or the identified cell may not be used in the additional beam measurement (if any).

According to an embodiment disclosed herein, the additional beam measurement may be performed only if the UE determines that the first beam measurement in step 810 did not identify any beam from the set of beams that has a sufficient performance. In this condition, it may be beneficial to indicate to the cellular network that the UE has other candidate antennal panels and conduct the additional beam measurement.

According to an embodiment disclosed herein, the cellular network may be configured to configure a corresponding cell ID (namely, SCellIndex) for a Component Carrier (CC) and/or a physical cell ID (namely, PCI) in a TCI configuration (Proposal 3.3).

In some scenarios, the UE may perform group-based beam reporting, which includes reporting measurement for each pair of beams in the beam set. According to an embodiment disclosed herein, in addition to the SSBRI and the CRI, the UE may be configured to report a corresponding cell ID (namely, SCellIndex) for a Component Carrier (CC) and/or a physical cell ID (namely, PCI) for each beam of each pair of beams (Proposal 3.4) in the group-based beam reporting. This allows the UE to indicate whether the UE supports to use independent beams to receive on two CCs at different frequency (e.g., different sub-bands of the NR FR2 band), and/or whether the UE supports to use independent beams to receive from two cells at the same frequency band.

As an exemplary scenario where the UE resides on two FR2 cells (a first cell and a second cell), the cellular network may allocate eight beams for a beam sweep procedure, with the first though the fourth beams transmitted by the first cell in the 28 GHz sub-band and the fifth though the eighth beams transmitted by the second cell in the 39 GHz sub-band. The UE may report the first and the sixth beams as a pair, along with SCellIndex and PCI associated with each beam. Accordingly, upon receiving the reporting, the cellular network may determine based on the reported SCellIndex and PCI that the UE is able to use independent beams to receive on two CCs at different frequency bands (namely, 28 GHz and 39 GHz sub-bands).

As another exemplary scenario where the UE resides on two FR2 cells (a first cell and a second cell), the cellular network may allocate eight beams for a beam sweep procedure, with the first though the fourth beams transmitted by the first cell in the 28 GHz sub-band and the fifth though the eighth beams transmitted by the second cell also in the 28 GHz sub-band. The UE may report the second and the fifth beams as a pair, along with SCellIndex and PCI associated with each beam. Accordingly, upon receiving the reporting, the cellular network may determine based on the reported SCellIndex and PCI that the UE is able to use independent beams to receive from two cells at the same frequency band (namely, the 28 GHz sub-band).

According to some embodiments disclosed herein, the UE with a plurality of antenna panels may be able to transmit different Sounding Reference Signals (SRS) simultaneously. In these embodiments, the UE may be configured to indicate to the cellular network such ability of SRS transmission (Proposal 3.5). The indication may be sent via UCI, MAC CE or RRC signaling.

In an embodiment, for SRS transmission in the same cell, the UE may be configured to send an indication regarding whether the UE is able to transmit different SRSs simultaneously in that same cell. The indication may include a pair of SRS Resource Indicators (SRIs). Each SRI of the pair may identify one SRS from a set of SRSs that are allocated by the cellular network for that cell. Upon receiving the indication, the cellular network may be configured to simultaneously receive the indicated SRSs for the same cell.

In an embodiment, for SRS transmission in different cells, the UE may be configured to send an indication regarding whether the UE is able to transmit different SRSs simultaneously in the different cells. The indication may include a pair of SRIs. Each SRI of the pair may identify one SRS from a respective set of SRSs, which are allocated by the cellular network for a respective one of the different cells. Upon receiving the indication, the cellular network may be configured to simultaneously receive the indicated SRSs for the different cells.

With the panel management disclosed herein, the UE having a plurality of antenna panels may be able to send a panel management indication to the cellular network. The panel management indication may indicate that the UE has more than one antenna panels. The panel management indication may also indicate a panel switch of the UE for additional beam measurement.

With the panel management disclosed herein, the UE is further able to indicate the SCellIndex and PCI to the cellular network in the beam report. The reported SCellIndex and PCI may identify specific CCs and cells associated with a respective beam. In some embodiment, the reported SCellIndex and PCI may be used to indicate specific CCs and cells associated with a failed beam. In some embodiments, the reported SCellIndex and PCI may be used to indicate the UE's ability for receiving independent beams. The UE may be further able to indicate its ability to transmit different SRSs simultaneously.

Embodiments contemplated herein include an apparatus comprising means to perform one or more elements of method 300, 700, 800 or any method element related to a UE. This apparatus may be, for example, an apparatus of a UE (such as a wireless device 202 that is a UE, as described herein).

Embodiments contemplated herein include one or more non-transitory computer-readable media comprising instructions to cause an electronic device, upon execution of the instructions by one or more processors of the electronic device, to perform one or more elements of method 300, 700, 800 or any method element related to a UE. This non-transitory computer-readable media may be, for example, a memory of a UE (such as a memory 206 of a wireless device 202 that is a UE, as described herein).

Embodiments contemplated herein include an apparatus comprising logic, modules, or circuitry to perform one or more elements of the method 300, 700, 800 or any method element related to a UE. This apparatus may be, for example, an apparatus of a UE (such as a wireless device 202 that is a UE, as described herein).

Embodiments contemplated herein include an apparatus comprising: one or more processors and one or more computer-readable media comprising instructions that, when executed by the one or more processors, cause the one or more processors to perform one or more elements of method 300, 700, 800 or any method element related to a UE. This apparatus may be, for example, an apparatus of a UE (such as a wireless device 202 that is a UE, as described herein).

Embodiments contemplated herein include a signal as described in or related to one or more elements of method 300, 700, 800 or any method element related to a UE.

Embodiments contemplated herein include a computer program or computer program product comprising instructions, wherein execution of the program by a processor is to cause the processor to carry out one or more elements of the method 300, 700, 800 or any method element related to a UE. The processor may be a processor of a UE (such as a processor(s) 204 of a wireless device 202 that is a UE, as described herein). These instructions may be, for example, located in the processor and/or on a memory of the UE (such as a memory 206 of a wireless device 202 that is a UE, as described herein).

Embodiments contemplated herein include an apparatus comprising means to perform one or more elements of method 600 or any method element related to a cellular network. This apparatus may be, for example, an apparatus of a base station (such as a network device 218 that is a base station, as described herein).

Embodiments contemplated herein include one or more non-transitory computer-readable media comprising instructions to cause an electronic device, upon execution of the instructions by one or more processors of the electronic device, to perform one or more elements of method 600 or any method element related to a cellular network. This non-transitory computer-readable media may be, for example, a memory of a base station (such as a memory 222 of a network device 218 that is a base station, as described herein).

Embodiments contemplated herein include an apparatus comprising logic, modules, or circuitry to perform one or more elements of method 600 or any method element related to a cellular network. This apparatus may be, for example, an apparatus of a base station (such as a network device 218 that is a base station, as described herein).

Embodiments contemplated herein include an apparatus comprising: one or more processors and one or more computer-readable media comprising instructions that, when executed by the one or more processors, cause the one or more processors to perform one or more elements of method 600 or any method element related to a cellular network. This apparatus may be, for example, an apparatus of a base station (such as a network device 218 that is a base station, as described herein).

Embodiments contemplated herein include a signal as described in or related to one or more elements of method 600 or any method element related to a cellular network.

Embodiments contemplated herein include a computer program or computer program product comprising instructions, wherein execution of the program by a processing element is to cause the processing element to carry out one or more elements of method 600 or any method element related to a cellular network. The processor may be a processor of a base station (such as a processor(s) 220 of a network device 218 that is a base station, as described herein). These instructions may be, for example, located in the processor and/or on a memory of the UE (such as a memory 222 of a network device 218 that is a base station, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A user equipment (UE), comprising:
at least one antenna;
at least one radio coupled to the at least one antenna; and
a processor coupled to the at least one radio;
wherein the UE is capable of maintaining a dual connectivity with a cellular network, the dual connectivity including connectivity of a first radio access technology (RAT) and connectivity of a second RAT, wherein the first RAT is Long Term Evolution (LTE) and the second RAT is New Radio (NR), and wherein the second RAT includes a first operation that operates in NR FRI band and a second operation that operates in NR FR2 band;
wherein the UE is configured to:
in accordance with a determination that a state of the UE satisfies first predetermined trigger criteria, select the second RAT from among the first RAT and the second RAT;
in accordance with a determination that the state of the UE satisfies second predetermined trigger criteria, select the second operation that operates in the NR FR2 band from among the first operation and the second operation;
send a RAT request to the cellular network, the RAT request indicating at least one preferred RAT comprising the second RAT and at least one preferred operation comprising the second operation that operates in the NR FR2 band; and
use the at least one preferred RAT and the at least one preferred operation to carry data transmission between the UE and the cellular network.

2. The UE of claim 1, wherein using the at least one preferred RAT to carry data transmission between the UE and the cellular network comprises:
using the at least one preferred operation selected from the first operation and the second operation of the second RAT to carry data transmission between the UE and the cellular network.

3. The UE of claim 1, wherein the UE is configured to:
in response to receiving, from the cellular network, a confirmation to the RAT request, using the at least one preferred RAT to carry data transmission between the UE and the cellular network.

4. The UE of claim 1, wherein using the at least one preferred RAT to carry data transmission between the UE and the cellular network comprises:
using the at least one preferred RAT to carry Data Radio Bearer (DRB) for the data transmission between the UE and the cellular network.

5. The UE of claim 1, wherein using the at least one preferred RAT to carry data transmission between the UE and the cellular network comprises:
maintaining a connection of the at least one preferred RAT between the UE and the cellular network; and
releasing a connection of any RAT of the first RAT and the second RAT other than the at least one preferred RAT.

6. The UE of claim 1, wherein the first predetermined trigger criteria and the second predetermined criteria are associated with at least one condition of the following:
an amount of data to be transmitted or received by the UE;
an expected data rate of the UE;
a radio condition of the UE;
a power consumption condition of the UE;
a battery condition of the UE; or
a thermal condition of the UE.

7. The UE of claim 1, wherein determining the state of the UE satisfies the first predetermined trigger criteria and the second predetermined criteria comprises at least one of:
filtering measurement associated with at least one condition; or
determining measurement related to the at least one preferred RAT is better than measurement related to a RAT that is currently used between the UE and the cellular network.

8. The UE of claim 7, wherein determining measurement related to the at least one preferred RAT is better than measurement related to a RAT that is currently used between the UE and the cellular network comprises at least one of:
determining measurement related to the at least one preferred RAT is better than measurement related to a RAT that is currently used between the UE and the cellular network by at least a predetermined threshold; or
determining measurement related to the at least one preferred RAT is better than measurement related to a RAT that is currently used between the UE and the cellular network for at least a predetermined period.

9. The UE of claim 1, wherein the RAT request is sent by the UE as assistance information to the cellular network.

10. The UE of claim 1, wherein the UE is further configured to:
send a second RAT request to the cellular network, the second RAT request indicating at least one updated RAT selected from the first RAT and the second RAT; and
use the at least one updated RAT to carry data transmission between the UE and the cellular network.

11. A method for a user equipment (UE), wherein the UE is capable of maintaining a dual connectivity with a cellular network, the dual connectivity including connectivity of a first radio access technology (RAT) and connectivity of a second RAT, wherein the first RAT is Long Term Evolution (LTE) and the second RAT is New Radio (NR), and wherein the second RAT includes a first operation that operates in NR FR1 band and a second operation that operates in NR FR2 band;

the method comprising:

in accordance with a determination that a state of the UE satisfies first predetermined trigger criteria, selecting the second RAT from among the first RAT and the second RAT;

in accordance with a determination that the state of the UE satisfies second predetermined trigger criteria, selecting the second operation that operates in the NR FR2 band from among the first operation and the second operation;

sending a RAT request to the cellular network, the RAT request indicating at least one preferred RAT comprising the second RAT and at least one preferred operation comprising the second operation that operates in the NR FR2 band; and using the at least one preferred RAT and the at least one preferred operation to carry data transmission between the UE and the cellular network.

12. The method of claim 11, wherein using the at least one preferred RAT to carry data transmission between the UE and the cellular network comprises:

using the at least one preferred operation selected from the first operation and the second operation of the second RAT to carry data transmission between the UE and the cellular network.

13. The method of claim 11, further comprising:

in response to receiving, from the cellular network, a confirmation to the RAT request, using the at least one preferred RAT to carry data transmission between the UE and the cellular network.

14. The method of claim 11, wherein using the at least one preferred RAT to carry data transmission between the UE and the cellular network comprises:

using the at least one preferred RAT to carry Data Radio Bearer (DRB) for the data transmission between the UE and the cellular network.

15. The method of claim 11, wherein using the at least one preferred RAT to carry data transmission between the UE and the cellular network comprises:

maintaining a connection of the at least one preferred RAT between the UE and the cellular network; and releasing a connection of any RAT of the first RAT and the second RAT other than the at least one preferred RAT.

* * * * *